No. 754,315.

Patented March 8, 1904.

UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN AND SODA FABRIK.

AZO DYE AND PROCESS OF MAKING SAME.

SPECIFICATION forming part of Letters Patent No. 754,315, dated March 8, 1904.

Application filed March 19, 1903. Serial No. 148,610. (Specimens.)

*To all whom it may concern:*

Be it known that we, PAUL JULIUS and ERNST FUSSENEGGER, both doctors of philosophy, subjects of the Emperor of Austria-Hungary, residing at Ludwigshafen-on-the-Rhine, in the Empire of Germany, have invented new and useful Improvements in Azo Coloring-Matter and Processes of Producing Same, of which the following is a specification.

We have discovered that by treating one molecular proportion of a monoalkyl paraphenylenediamin with at least two molecular proportions of nitrous acid bodies which may be regarded as para diazo monoalkylphenyl-nitrosamins result and that these combine most smoothly and easily with 1.8 dihydroxynaphthalene 3.6 disulfo acid, whether the combination be effected in presence of caustic alkali, sodium carbonate, or sodium acetate. The new coloring-matters so obtained, which still contain a nitroso group, can be fixed as such on the fiber if dyed from a bath but slightly acidified with acetic acid, the shades produced being violet-red; but if dyed in the usual manner in the presence of mineral acid the nitroso group is split off and blue dyeings result. When these dyes are used for dyeing blue shades, it is advantageous to add to the dye-bath bisulfite of soda solution. By heating aqueous solutions of the new nitroso dyestuffs with saponifying agents, such as dilute hydrochloric acid or dilute caustic alkali, the nitroso group is also split off.

The following examples will serve to illustrate the nature of this invention, which, however, is not confined to the examples:

*Example 1—Production of a nitroso coloring-matter.*—Dissolve one hundred and ninety-five parts of monomethyl paraphenylenediamin chlorhydrate in two thousand parts of water and three hundred parts of hydrochloric acid (containing about thirty per cent. HCl) and while cooling add a solution of one hundred and thirty-eight parts of sodium nitrite in sufficient water. A yellow-brown solution of para-diazomethylphenylnitrosamin is obtained, which is allowed to flow into a solution of three hundred and forty-two parts of 1.8 dihydroxynaphthalene 3.6 disulfo-acid monosodium salt, to which about five hundred parts of crystallized sodium acetate have been added. After stirring for about half an hour salt out the coloring-matter by means of common salt. In a similar manner the dyestuff from monoethylparaphenylenediamin can be obtained.

*Example 2— Splitting off the nitroso group.*—Dissolve ten parts of the coloring-matter obtained in the previous Example 1 in one hundred parts of dilute hydrochloric acid (containing ten per cent. HCl) and heat for a short time to boiling. The saponified coloring-matter can be precipitated from the cold solution by the addition of common salt. It dyes wool blue shades.

Our new dyestuffs are characterized by containing a nitroso group and yielding on suitable reduction a monoalkylparaphenylenediamin body and amido 1.8 dihydroxynaphthalene 3.6 disulfo-acid.

We claim—

1. The process of manufacturing azo dyes by combining a para diazo monoalkylphenylnitrosamin with 1.8 dihydroxynaphthalene 3.6 disulfo-acid and saponifying the product obtained.

2. The process of manufacturing azo dyes by combining a para diazomonoalkylphenylnitrosamin with 1.8 dihydroxynaphthalene 3.6 disulfo-acid.

3. The process of manufacturing azo dyes by combining para diazoethylphenylnitrosamin with 1.8 dihydroxynaphthalene 3.6 disulfo-acid and saponifying the product obtained.

4. The manufacture of azo dyes by combining para diazo ethylphenylnitrosamin with 1.8 dihydroxynaphthalene 3.6 disulfo-acid.

5. The new azo dye which contains a nitroso group and on reduction yields a monoalkyl paraphenylenediamin body and amido 1.8 dihydroxynaphthalene 3.6 disulfo-acid.

6. The new azo dye which contains a nitroso group and on reduction yields monoethyl paraphenylenediamin and amido 1.8 dihydroxynaphthalene 3.6 disulfo-acid.

In testimony whereof we have hereunto set our hands in the presence of two subscribing witnesses.

PAUL JULIUS.
ERNST FUSSENEGGER.

Witnesses:
JOHN L. HEINKE,
JACOB ADRIAN.